(12) United States Patent
Johnson et al.

(10) Patent No.: US 9,174,490 B2
(45) Date of Patent: Nov. 3, 2015

(54) HEAVY GOODS VEHICLE TIRE

(75) Inventors: Philippe Johnson, Perignat sur Allier (FR); Alain Domingo, Orleat (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 902 days.

(21) Appl. No.: 12/678,249

(22) PCT Filed: Sep. 1, 2008

(86) PCT No.: PCT/EP2008/061502
§ 371 (c)(1),
(2), (4) Date: Aug. 3, 2010

(87) PCT Pub. No.: WO2009/033977
PCT Pub. Date: Mar. 19, 2009

(65) Prior Publication Data
US 2010/0294413 A1     Nov. 25, 2010

(30) Foreign Application Priority Data

Sep. 13, 2007    (FR) ...................................... 07 06494

(51) Int. Cl.
*B60C 9/22*         (2006.01)
*B60C 9/28*         (2006.01)
*B60C 9/18*         (2006.01)
(Continued)

(52) U.S. Cl.
CPC . *B60C 9/28* (2013.01); *B29C 35/00* (2013.01); *B60C 9/185* (2013.01); *B60C 9/2006* (2013.01);
(Continued)

(58) Field of Classification Search
CPC ........ B60C 9/28; B60C 9/185; B60C 9/1835; B60C 9/2006; B60C 9/18; B60C 9/20; B60C 2009/1842; B60C 2009/1878; B60C 2009/2016; B60C 2009/2019; B60C 2009/2051; B60C 2009/2032; B60C 2009/208; B60C 2009/2214; B60C 2009/2228; B60C 2009/2233; B60C 2009/2252; B60C 2009/2261; B60C 2009/2276; B60C 2009/228; B60C 2009/229
USPC ........................................ 152/532, 531, 526
IPC ......................................................... B60C 9/22
See application file for complete search history.

(56) References Cited

U.S. PATENT DOCUMENTS 6,394,160 B1 * 5/2002 Assaad et al. .................. 152/536
2004/0079460 A1 * 4/2004 Maruoka et al. .......... 152/209.14
(Continued)

FOREIGN PATENT DOCUMENTS

| FR | 2 770 458 | 5/1999 |
| FR | 2 857 620 | 1/2005 |
| WO | WO 00/69659 | 11/2000 |

*Primary Examiner* — Justin Fischer
*Assistant Examiner* — Philip N Schwartz
(74) *Attorney, Agent, or Firm* — Cozen O'Connor

(57) ABSTRACT

A tire comprising a crown reinforcement formed from at least two working crown layers and from at least one layer of circumferential reinforcing elements positioned radially between two working crown layers, the working crown layers adjacent to the layer of circumferential reinforcing elements being on each side of the equatorial plane and in the axial continuation of the layer of circumferential reinforcing elements coupled over an axial width, in order thereafter to be decoupled. A first additional layer of polymer blend having a width at least equal to the width 1 of the coupling zone and having a maximum thickness of less than two times the thickness of the layer of circumferential reinforcing elements is positioned radially under the working crown layer radially adjacent to and inside the layer of circumferential reinforcing elements and is at least partially radially superposed on the coupling zone of the working crown layers.

19 Claims, 3 Drawing Sheets

(51) Int. Cl.
*B29C 35/00* (2006.01)
*B60C 9/20* (2006.01)

(52) U.S. Cl.
CPC ... *B60C 2009/1842* (2013.04); *B60C 2009/229* (2013.04); *B60C 2009/2214* (2013.04); *B60C 2009/2261* (2013.04)

(56) References Cited

U.S. PATENT DOCUMENTS

2006/0169380 A1\* 8/2006 Radulescu et al. ............ 152/531
2007/0277918 A1\* 12/2007 Ellwood et al. ............... 152/532

\* cited by examiner

HEAVY GOODS VEHICLE TIRE

RELATED APPLICATIONS

This is a U.S. national stage under 35 USC §371 of application No. PCT/EP2008/061502, filed on Sep. 1, 2008.

This application claims the priority of French application no. 07/06494 filed Sep. 13, 2007, the entire content of which is hereby incorporated by reference.

FIELD OF THE INVENTION

The present invention relates to a tire with a radial carcass reinforcement, and more particularly to a tire intended to be fitted to vehicles that carry heavy loads and drive at sustained speeds, such as, for example, lorries, tractors, trailers, or road buses.

BACKGROUND OF THE INVENTION

The reinforcing structure or reinforcement of tires, particularly of tires for vehicles of the heavy vehicle type, is currently—and usually—made up of a stack of one or more plies conventionally known as "carcass plies", "crown plies", etc. This way of naming the reinforcements stems from the method of manufacture, which involves creating a series of semi-finished products in the form of plies, provided with thread-like reinforcements, often longitudinal, which are then assembled or stacked in order to build a green tire. The plies are produced flat, with substantial dimensions, and are then cut to the dimensions of a given product. The plies are also initially assembled substantially flat. The green tire thus produced is then shaped to adopt the toroidal profile typical of tires. The semi-finished "finishing" products are then applied to the green tire in order to obtain a product ready to be cured.

A "conventional" type of method such as this involves, particularly during the phase of manufacturing the green tire, the use of an anchoring element (generally a bead wire) which is used to anchor or retain the carcass reinforcement in the bead region of the tire. Thus, for this type of method, a portion of all the plies that make up the carcass reinforcement (or just some of them) is folded back around a bead wire positioned in the bead of the tire. That then anchors the carcass reinforcement in the bead.

The widespread use across industry of this conventional type of method, in spite of there being numerous variations in how the plies are created and assembled, has led those skilled in the art to adopt a vocabulary based on the method; hence the terminology generally used, involving in particular the terms "plies", "carcass", "bead wire", "shaping" to denote the transition from a flat profile to a toroidal profile, etc.

Nowadays there are tires which do not strictly speaking have "plies" or "bead wires" as understood from the above definitions. For example, document EP 0 582 196 describes tires manufactured without the aid of semi-finished products in the form of plies. For example, the reinforcing elements of the various reinforcing structures are applied directly to the adjacent layers of rubber compounds, everything being applied in successive layers to a toroidal core, the shape of which directly yields a profile similar to the final profile of the tire that is in the process of being manufactured. Thus, in this case, there are no longer any "semi-finished products" or "plies", or "bead wires". The basic products such as the rubber compounds and the reinforcing elements in the form of threads or filaments are applied directly to the core. As this core is of a toroidal shape, there is no longer any need to form the green tire in order to change from a flat profile to a profile in the form of a torus.

Furthermore, the tires described in that document do not use the "traditional" turning back of the carcass ply around a bead wire. That type of anchorage is replaced by an arrangement in which circumferential threads are positioned adjacent to the said sidewall reinforcing structure, everything being embedded in an anchoring or bonding rubber compound.

There are also methods of assembly on a toroidal core that employ semi-finished products specially designed for rapid, effective and simple laying onto a central core. Finally, it is also possible to use a hybrid comprising both certain semi-finished products for achieving certain architectural aspects (such as plies, bead wires etc.), while others are created by applying compounds and/or reinforcing elements directly.

In the present document, in order to take account of recent technological advances both in the field of manufacture and in the design of products, the conventional terms such as "plies", "bead wires", etc., are advantageously replaced by terms which are neutral or independent of the type of method used. Hence, the term "carcass type reinforcement" or "sidewall reinforcement" can validly be used to denote the reinforcing elements of a carcass ply in the conventional method, and the corresponding reinforcing elements, generally applied to the sidewalls, of a tire produced according to a method that does not involve semi-finished products. The term "anchoring zone" for its part, can just as easily denote the "traditional" turning back of the carcass ply around a bead wire in a conventional method as it can the assembly formed by the circumferential reinforcing elements, the rubber compound and the adjacent sidewall reinforcing portions of a bottom region created using a method which involves applying elements to a toroidal core.

In general, in tires of the heavy vehicle tire type, the carcass reinforcement is anchored on each side in the region of the bead and is surmounted radially by a crown reinforcement, constituted by at least two layers that are superposed and formed of threads or cords which are parallel within each layer and crossed from one layer to the next making with the circumferential direction angles between 10° and 45°. The said working layers, that form the working reinforcement, may also be covered by at least one so-called protective layer formed of reinforcing elements, which are advantageously metal and extensible, known as elastic reinforcing elements. It may also comprise a layer of metal cords or threads with low extensibility, that make an angle comprised between 45° and 90° with the circumferential direction, this ply, known as a triangulation ply, being situated radially between the carcass reinforcement and the first so-called working crown ply, formed of parallel cords or threads at angles of at most 45° in terms of absolute value. The triangulation ply forms, with at least the said working ply, a triangulated reinforcement which, under the various stresses that it experiences, undergoes very little deformation, the essential role of the triangulation ply being to absorb transverse compressive forces to which all of the reinforcing elements are subjected in the region of the crown of the tire.

In the case of heavy vehicle tires, a single protective layer is usually present and its protective elements are, mostly, oriented in the same direction and at the same angle in terms of absolute value as those of the reinforcing elements of the radially outermost and therefore radially adjacent working layer. In the case of engineering works vehicle tires intended to run on somewhat uneven ground, the presence of two protective layers is advantageous, the reinforcing elements being crossed from one layer to the next and the reinforcing elements of the radially interior protective layer being crossed with the inextensible reinforcing elements of the working layer that is radially exterior and adjacent to the said radially interior protective layer.

Cords are said to be inextensible when the said cords have, under a tensile force equal to 10% of the breaking strength, a relative elongation of 0.2% at most.

Cords are said to be elastic when the said cords have, under a tensile force equal to the breaking strength, a relative elongation at least equal to 3% with a maximum tangent modulus of less than 150 GPa.

Circumferential reinforcing elements are reinforcing elements which make, with the circumferential direction, angles within the range +2.5°, −2.5° about 0°.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it revolves under normal use.

A radial or meridian plane is a plane containing the axis of rotation of the tire.

The circumferential median plane or equatorial plane is a plane perpendicular to the axis of rotation of the tire and which divides the tire into two halves.

Some present-day tires, known as "road" tires, are intended to run at high speed and over increasingly long distances, because of the improvement to the road network and the expansion of the motorway network worldwide. Although all of the conditions under which such a tire is called upon to run undoubtedly allows an increase in the number of kilometers covered, because tire wear is lower, this is at the expense of tire durability, particularly of crown reinforcement durability.

The issue is that there are stresses in the crown reinforcement and more particularly shear stresses between the crown layers, combined with a not insignificant increase in operating temperature at the ends of the axially shortest crown layer, which result in the appearance and propagation of cracks in the rubber at the said ends. The same problem exists in the case of edges of two layers of reinforcing elements, the said other layer not necessarily being radially adjacent to the first.

To improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply, have already been applied.

Patent FR 1 389 428, in order to increase the resistance to damage of the rubber compounds situated near the edges of the crown reinforcement, recommends the use, in combination with a low-hysteresis tread, of a rubber profiled element covering at least the sides and the marginal edges of the crown reinforcement and consisting of a low-hysteresis rubber compound.

Patent FR 2 222 232, in order to avoid separation between crown reinforcement plies, teaches the coating of the ends of the reinforcement in a rubber mat, the Shore A hardness of which differs from that of the tread surmounting the said reinforcement, and is higher than the Shore A hardness of the profiled element of rubber compound positioned between the edges of crown reinforcement and carcass reinforcement plies.

French application FR 2 728 510 proposes positioning, on the one hand, between the carcass reinforcement and the crown reinforcement working ply radially closest to the axis of rotation, an axially continuous ply formed of inextensible metal cords that make an angle of at least 60° with the circumferential direction and the axial width of which is at least equal to the axial width of the shortest working crown ply and, on the other hand, between the two working crown plies, an additional ply formed of metal elements directed substantially parallel to the circumferential direction.

Prolonged running of the tires thus constructed under particularly harsh conditions has revealed limits in terms of the endurance of these tires.

To remedy such disadvantages and improve the endurance of the crown reinforcement of these tires, it has been proposed that there be associated with the angle working crown layers at least one additional layer of reinforcing elements substantially parallel to the circumferential direction. Patent application WO 99/24269 proposes, notably, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then decoupled by profiled elements of rubber compound at least over the remainder of the width common to the said two working plies.

The results obtained in terms of endurance and wear during prolonged running on high-speed routes are satisfactory. However, it emerges from tests carried out that the set of the tires fitted to a vehicle has scattered performances in terms of endurance; in other words, although the performances are actually better than with the preceding solutions, it turns out that the results obtained are not always homogeneous in terms of value, the scatter of the results being relatively high. This remains true for various tires tested successively on one and the same vehicle and placed at the same location on this vehicle.

SUMMARY OF THE INVENTION

One object of the invention is to provide tires for "heavy vehicles", the endurance and wear performance of which is maintained for road use and the performance, especially endurance performance, of which can be reproduced more homogeneously on all the tires.

This object is achieved, according to an aspect of the invention, by a tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the said tread being connected to two beads via two sidewalls, the crown reinforcement comprising at least one layer of circumferential reinforcing elements positioned radially between two working crown layers, the working crown layers adjacent to the layer of circumferential reinforcing elements being on each side of the equatorial plane and in the axial continuation of the layer of circumferential reinforcing elements coupled over an axial width 1, in order thereafter to be decoupled by profiled elements of rubber compound at least over the remainder of the width common to the said two working layers, a first additional layer of polymer blend having a width at least equal to the width 1 of the coupling zone of the working crown layers adjacent to the layer of circumferential reinforcing elements and having a maximum thickness of less than two times the thickness of the layer of circumferential reinforcing elements, being positioned radially under the working crown layer radially adjacent to and inside the layer of circumferential reinforcing elements and the said first additional layer of polymer blend being at least partially radially superposed on the coupling zone of the working crown layers adjacent to the layer of circumferential reinforcing elements.

Within the meaning of the invention, an additional layer means a layer different from the other layers and especially from the calendering layers of the various layers of reinforcing elements in contact therewith.

The thicknesses of the layers are measured in a radial direction.

The axial widths of the layers of reinforcing elements and of the layers of polymer blend are measured over a transverse section of a tire, the tire therefore being in an uninflated state.

Within the meaning of one embodiment of the invention, working crown layers are said to be coupled when the respective reinforcing elements of each of the layers are radially separated by 1.5 mm at most, the said thickness of rubber being measured radially between the respective upper and lower generatrices of the said reinforcing elements.

The presence of coupling between the working crown layers adjacent to the layer of circumferential reinforcing elements allows a reduction in the tensile stresses acting on the axially outermost circumferential elements situated closest to the coupling.

The thickness of the decoupling profiled elements between the working crown layers, axially exterior to the coupling zone, measured in line with the ends of the least wide working ply, will be equal to at least two millimeters and preferably greater than 2.5 mm.

During their studies, the inventors have been able to demonstrate that the tire manufacturing techniques resulted in slight variations of the radial positioning of the coupling zone of the working crown layers which leads to local curvatures of the reinforcing elements of the working crown layers which may vary. The working crown layer radially adjacent and exterior to the layer of circumferential reinforcing elements may especially be, due to the production techniques, the only one to exhibit a radial displacement in order to achieve the coupling with the radially interior working crown layer; the analysis of the tires shows that this radial displacement may vary from one tire to another, which may explain the scatter as regards the results in terms of endurance. The presence of the first additional layer of polymer blend allows control of the position of the radially interior working crown layer and, due to its dimensions, management of the radial displacement allowing coupling with the radially exterior working crown layer. The invention makes it possible, due to this control, to obtain more homogeneous results as regards the endurance performance of the tires. Moreover, the radial displacement of the working crown layer allows a better distribution in the axial direction of the tensions of the reinforcing elements of each of the working layers, the radially exterior working crown layer definitely not being the only one to be radially displaced in the coupling zone.

According to one preferred embodiment of the invention, the width of the first additional layer of polymer blend is less than 0.45 times the difference between the width of the working crown layer radially adjacent to and inside the layer of circumferential reinforcing elements and the width of the layer of circumferential reinforcing elements. According to this preferred embodiment of the invention, the first additional layer of polymer blend does not harm the presence of a decoupling of the working crown layers in a zone axially exterior to the coupling zone and enables the axially interior end of the coupling zone not to be directly in the continuity of the layer of circumferential reinforcing elements.

Advantageously, the Mooney plasticity of the first additional layer of uncrosslinked blend is greater than the Mooney plasticity of the uncrosslinked calendering blend of the working crown layers adjacent to the first additional layer of circumferential reinforcing elements.

The calendering of the crown layers corresponds to the rubber mass which surrounds the reinforcing elements in order to form the said layer.

Regarding the Mooney plasticity, use is made of an oscillating consistometer as described in French standard NF T 43-005 (November 1980). The Mooney plasticity measurement is carried out according to the following principle: the composition in the green state (i.e., before curing) is molded in a cylindrical chamber heated to 100° C. After preheating for one minute, the rotor rotates within the test specimen at 2 rpm and the working torque for maintaining this movement is measured after rotating for 4 minutes. The Mooney plasticity (ML 1+4) is expressed in "Mooney units" (MU, with 1 MU=0.83 Newton.meter).

Preferably, the Mooney plasticity of the first additional layer of uncrosslinked blend is greater than 90 MU and preferably greater than 95 MU.

Such choices of Mooney plasticity of the first additional layer of polymer blend especially enable the said layer to retain its geometry during the tire manufacturing process.

According to one advantageous variant of the invention, a second additional layer of polymer blend having a thickness greater than 1.5 mm over an axial width greater than 0.1×d is positioned axially between the axially exterior end of the layer of circumferential reinforcing elements and the axially interior end of the coupling zone of the working crown layers adjacent on both sides to the layer of circumferential reinforcing elements.

The distance d is the axial distance separating the end of the layer of circumferential reinforcing elements and the end of the working crown layer adjacent to the narrowest layer of circumferential reinforcing elements.

The inventors have been able to demonstrate that the presence of the second additional layer of polymer blend having a thickness greater than 1.5 mm over an axial width greater than 0.1×d at the end of the layer of circumferential reinforcing elements makes it possible to retain a minimum distance between the coupling zone of the working crown layers and the end of the layer of circumferential reinforcing elements. This minimum distance makes it possible, in particular, to eliminate the risks of seeing radii of curvature of the reinforcing elements of the working crown layers appear that are too small and which seem to be able to be the cause of worse endurance performance of the tires. The presence of the second additional layer of polymer blend therefore further helps to improve the homogeneity of the results in terms of endurance performance of the tires.

According to one preferred embodiment of the invention, the second additional layer of polymer blend positioned axially between the axially exterior end of the layer of circumferential reinforcing elements and the axially interior end of the coupling zone of the working crown layers adjacent to the layer of circumferential reinforcing elements has an axial width of less than 0.5×d.

This preferred embodiment of the invention makes it possible, in particular, to limit the risks of an air pocket appearing between the end of the layer of circumferential reinforcing elements and the coupling zone of the working crown layers. Such an embodiment leads, in particular, to an improvement of manufacturing yields, the presence of air possibly resulting in the scrappage of a tire.

One advantageous variant of the invention makes the provision that the Mooney plasticity of the second additional layer of uncrosslinked blend is greater than the Mooney plasticity of the uncrosslinked calendering blend of the working crown layers adjacent to the layer of circumferential reinforcing elements.

Preferably, the Mooney plasticity of the second additional layer of uncrosslinked blend is greater than 90 MU and preferably greater than 95 MU.

Such choices regarding the Mooney plasticity of the second additional layer of polymer blend, which defines the distance between the coupling zone of the working crown layers and the end of the layer of circumferential reinforcing elements, enable the said layer to retain its geometry during the tire manufacturing process.

According to one advantageous embodiment variant of the invention, the layer of circumferential reinforcing elements has an axial width greater than 0.4×S.

S is the maximum axial width of the tire when the latter is mounted on its service rim and inflated to its recommended pressure.

According to a preferred embodiment of the invention, at least two working crown layers have different axial widths, the difference between the axial width of the axially widest working crown layer and the axial width of the axially least wide working crown layer being between 10 and 30 mm.

Preferably too, the axially widest working crown layer is radially on the interior of the other working crown layers.

According to an advantageous embodiment of the invention, the reinforcing elements of at least one layer of circumferential reinforcing elements are metal reinforcing elements with a secant modulus at 0.7% elongation between 10 and 120 GPa and a maximum tangent modulus of less than 150 GPa.

According to a preferred embodiment, the secant modulus of the reinforcing elements at 0.7% elongation is less than 100 GPa, and greater than 20 GPa, preferably between 30 and 90 GPa and more preferably still less than 80 GPa.

Again as a preference, the maximum tangent modulus of the reinforcing elements is less than 130 GPa and more preferably still less than 120 GPa.

The moduli expressed hereinabove are measured on a curve of tensile stress as a function of elongation determined with a preload of 20 MPa normalized to the cross section of metal of the reinforcing element, the tensile stress corresponding to a measured tension normalized to the cross section of metal of the reinforcing element.

The moduli of the same reinforcing elements can be measured on a curve of tensile stress as a function of elongation determined with a preload of 10 MPa normalized to the overall cross section of the reinforcing element, the tensile stress corresponding to a measured tension normalized to the overall cross section of the reinforcing element. The overall cross section of the reinforcing element is the cross section of a composite element made of metal and of rubber, the latter notably having penetrated the reinforcing element during the tire curing phase.

According to this formulation, relating to the overall cross section of the reinforcing element, the reinforcing elements of the axially exterior parts and of the central part of at least one layer of circumferential reinforcing elements are metal reinforcing elements with a secant modulus at 0.7% elongation between 5 and 60 GPa and a maximum tangent modulus of less than 75 GPa.

According to a preferred embodiment, the secant modulus of the reinforcing elements at 0.7% elongation is less than 50 GPa and greater than 10 GPa, preferably between 15 and 45 GPa and more preferably still, less than 40 GPa.

Preferably also, the maximum tangent modulus of the reinforcing elements is less than 65 GPa and more preferably still, less than 60 GPa.

According to a preferred embodiment, the reinforcing elements of at least one layer of circumferential reinforcing elements are metal reinforcing elements having a curve of tensile stress as a function of relative elongation with shallow gradients for short elongations and a substantially constant and steep gradient for higher elongations. Such reinforcing elements of the additional ply are usually known as "bi-modulus" elements.

According to a preferred embodiment of the invention, the substantially constant and steep gradient appears starting from a relative elongation between 0.1% and 0.5%.

The various abovementioned characteristics of the reinforcing elements are measured on reinforcing elements taken from tires.

Reinforcing elements more particularly suited to creating at least one layer of circumferential reinforcing elements according to the invention are, for example, assemblies of the formula 21.23, the construction of which is 3×(0.26+6×0.23) 4.4/6.6 SS; this stranded cord is made up of 21 elementary threads of formula 3×(1+6), with 3 twisted-together strands each made up of 7 threads, one thread forming a central core of a diameter equal to 26/100 mm, and 6 wound threads of diameter equal to 23/100 mm. A cord such as this has a secant modulus at 0.7% equal to 45 GPa and a maximum tangent modulus equal to 98 GPa, measured on a curve of tensile stress as a function of elongation determined with a preload of 20 MPa normalized to the cross section of metal of the reinforcing element, the tensile stress corresponding to a measured tension normalized to the cross section of metal of the reinforcing element. On a curve of tensile stress as a function of elongation determined with a preload of 10 MPa normalized to the overall cross section of the reinforcing element, the tensile stress corresponding to a measured tension normalized to the overall cross section of the reinforcing element, this cord of formula 21.23 has a secant modulus at 0.7% equal to 23 GPa and a maximum tangent modulus equal to 49 GPa.

Likewise, another example of reinforcing elements is an assembly of formula 21.28, the construction of which is 3×(0.32+6×0.28) 6.2/9.3 SS. This cord has a secant modulus at 0.7% equal to 56 GPa and a maximum tangent modulus equal to 102 GPa, both measured on a curve of tensile stress as a function of elongation determined with a preload of 20 MPa normalized to the cross section of metal of the reinforcing element, the tensile stress corresponding to a measured tension normalized to the cross section of metal of the reinforcing element. On a curve of tensile stress as a function of elongation determined with a preload of 10 MPa normalized to the overall cross section of the reinforcing element, the tensile stress corresponding to a measured tension normalized to the overall cross section of the reinforcing element, this cord of formula 21.28 has a secant modulus of 0.7% equal to 27 GPa and a maximum tangent modulus equal to 49 GPa.

The use of such reinforcing elements in at least one layer of circumferential reinforcing elements makes it possible in particular to maintain satisfactory layer rigidities even after the shaping and curing steps in conventional manufacturing methods.

The metal elements are preferably steel cords.

An embodiment of the invention, in order to reduce the tensile stresses acting on the axially outermost circumferential elements also advantageously has it that the angle formed with the circumferential direction by the reinforcing elements of the working crown layers is less than 30° and preferably less than 25°.

According to another advantageous variant of the invention, the working crown layers comprise reinforcing elements that are crossed from one ply to the other, making with the circumferential direction angles that vary according to the axial direction, the said angles being greater on the axially outer edges of the layers of reinforcing elements with respect to the angles of the said elements measured at the circumferential mid-plane. Such an embodiment of the invention makes it possible to increase the circumferential rigidity in certain zones while on the other hand reducing it in others, notably in order to reduce the compression of the carcass reinforcement.

A preferred embodiment of the invention also has it that the crown reinforcement is supplemented radially on the outside by at least one additional layer, known as a protective layer, of so-called elastic reinforcing elements, oriented with respect to the circumferential direction at an angle between 10° and 45° and of the same direction as the angle formed by the inextensible elements of the working layer radially adjacent to it.

The protective layer may have an axial width smaller than the axial width of the least wide working layer. The said protective layer may also have an axial width greater than the axial width of the least wide working layer, such that it overlaps the edges of the least wide working layer and, when it is the radially uppermost layer that is the least wide, such that it is coupled, in the axial continuation of the additional reinforcement, with the widest working crown layer over an axial width in order thereafter, axially on the exterior, to be decoupled from the said widest working layer by profiled elements at least 2 mm thick. The protective layer formed of elastic reinforcing elements may, in the abovementioned case, on the one hand, possibly be decoupled from the edges of the said least wide working layer by profiled elements having a thickness appreciably smaller than the thickness of the profiled elements that separate the edges of the two working layers and, on the other hand, have an axial width less than or greater than the axial width of the widest crown layer.

According to any one of the aforementioned embodiments of the invention, the crown reinforcement may also be supplemented, radially on the inside between the carcass reinforcement and the radially inner working layer closest to the said carcass reinforcement, by a triangulation layer of inextensible metal reinforcing elements made of steel that make an angle greater than 60° with the circumferential direction in the same direction as the angle formed by the reinforcing elements of the radially closest carcass reinforcement layer.

The first additional layer of polymer blend is then advantageously radially exterior to the triangulation layer and preferably in contact therewith.

Another aspect of the invention is directed to a process for manufacturing a tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the said tread being connected to two beads via two sidewalls, the crown reinforcement comprising at least one layer of circumferential reinforcing elements positioned radially between two working crown layers, the working crown layers adjacent to the layer of circumferential reinforcing elements being on each side of the equatorial plane and in the axial continuation of the layer of circumferential reinforcing elements coupled over an axial width 1, in order thereafter to be decoupled by profiled elements of rubber compound at least over the remainder of the width common to the said two working layers, according to which a first layer of polymer blend having a width at least equal to the width 1 of the coupling zone of the working crown layers and having a maximum thickness of less than two times the thickness of the layer of circumferential reinforcing elements is positioned radially under the working crown layer radially adjacent to and inside the layer of circumferential reinforcing elements, the said first additional layer of polymer blend being at least partially radially superposed on the coupling zone of the working crown layers and the Mooney plasticity of the first additional layer of uncrosslinked blend being greater than the Mooney plasticity of the uncrosslinked calendering blend of the working crown layers adjacent to the layer of circumferential reinforcing elements.

Preferably, the Mooney plasticity of the first additional layer of uncrosslinked blend is greater than 90 MU and preferably greater than 95 MU.

According to one advantageous variant of the invention, a second additional layer of polymer blend having a thickness greater than 1.5 mm over an axial width greater than 0.1×d is positioned axially between the axially exterior end of the layer of circumferential reinforcing elements and the axially interior end of the coupling zone of the working crown layers adjacent to the layer of circumferential reinforcing elements.

Preferably, the Mooney plasticity of the second additional layer of uncrosslinked blend is greater than 90 MU and preferably greater than 95 MU.

BRIEF DESCRIPTION OF THE DRAWINGS

Other details and advantageous features of the invention will emerge hereinafter from the description of some exemplary embodiments of the invention, with reference to FIGS. 1 to 3 which depict.

DETAILED DESCRIPTION OF THE DRAWINGS

In order to make them easier to understand, the figures are not drawn to scale. The figures depict only half a view of a tire which continues symmetrically with respect to the axis XX' which represents the circumferential mid-plane or equatorial plane of a tire.

Figure 1:
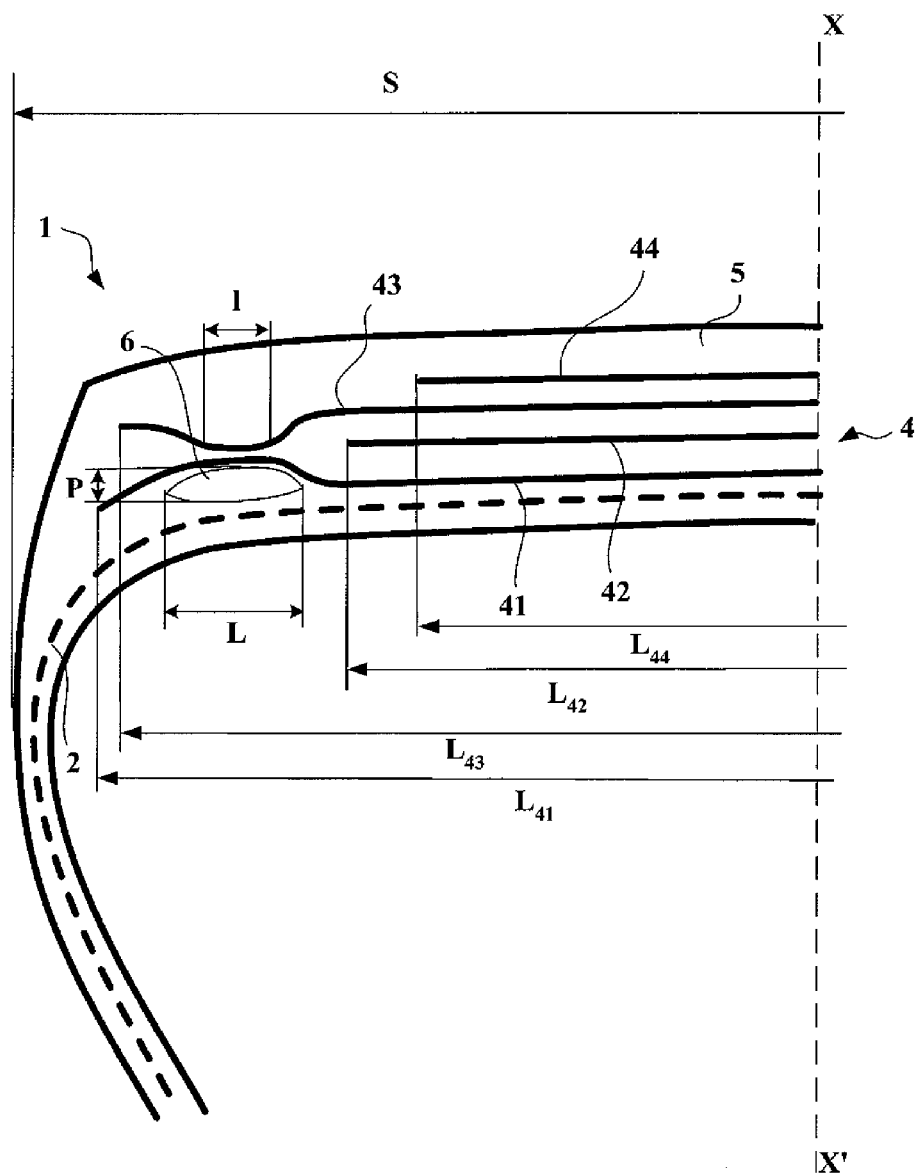
FIG. 1: a meridian view of a diagram of a tire according to one embodiment of the invention.

In FIG. 1, the tire 1, of the size 315/60 R 22.5, has an aspect ratio H/S equal to 0.60, H being the height of the tire 1 on its mounting rim and S its maximum axial width. The said tire 1 comprises a radial carcass reinforcement 2 anchored in two beads, not depicted in the figure. The carcass reinforcement is formed of a single layer of metal cords. This carcass reinforcement 2 is belted by a crown reinforcement 4, formed radially from the inside outwards:

of a first working layer 41 formed of unbelted inextensible 11.35 metal cords which are continuous across the entire width of the ply and directed at an angle equal to 18°, of a layer of circumferential reinforcing elements 42 formed of steel 21×28 metal cords, of "bi-modulus" type, of a second working layer 43 formed of unbelted inextensible 11.35 metal cords which are continuous across the entire width of the ply, directed at an angle of 26° and crossing with the metal cords of the layer 41, of a protective layer 44 formed of 18×23 elastic metal cords.

The crown reinforcement is itself capped by a tread 5.

The maximum axial width S of the tire is equal to 319 mm.

The axial width $L_{41}$ of the first working layer 41 is equal to 260 mm.

The axial width $L_{43}$ of the second working layer 43 is equal to 245 mm. The difference between the widths $L_{41}$ and $L_{43}$ is equal to 15 mm.

As for the overall axial width $L_{42}$ of the layer of circumferential reinforcing elements 42, it is equal to 200 mm.

The final crown ply 44 known as the protective ply has a width $L_{44}$ equal to 180 mm.

The two working layers 41 and 43 are, on each side of the equatorial plane and axially in the continuation of the layer of circumferential reinforcing elements 42, coupled over an axial width 1 equal to 8 mm. The cords of the first working layer 41 and the cords of the second working layer 43, over the axial width 1 of coupling of the two layers, are radially separated from one another by a layer of rubber, the thickness of which is minimal and corresponds to twice the thickness of the rubbery calendering layer of the unbelted 11.35 metal cords of which each working layer 41, 43 is formed, namely 0.8 mm. Over the remaining width common to the two working layers, the two working layers 41, 43 are separated by a rubber profiled element, not depicted in the figure, the thickness of the said profiled element being increasing from the axial exterior end of the coupling zone towards the end of the least wide working layer. The said profiled element advantageously has an axial width large enough to radially overlap the end of the widest working layer 41 which, in this case, is the working layer radially closest to the carcass reinforcement.

In accordance with the invention, a first additional layer 6 of polymer blend is present under the working crown layer 41 and allows, as shown in FIG. 1, a radial displacement of the latter in the coupling zone. This additional layer 6 of polymer blend has a Mooney plasticity equal to 95 MU, greater than the Mooney plasticities of the calenderings of the working layers 41, 43 which are identical and equal to 90 MU. The layer 6 of rubber compound also has a width L equal to 22 mm and a maximum thickness P equal to 2.8 mm, less than 2 times the thickness of the layer of circumferential reinforcing elements 42, equal to 2 mm.

Figure 2:
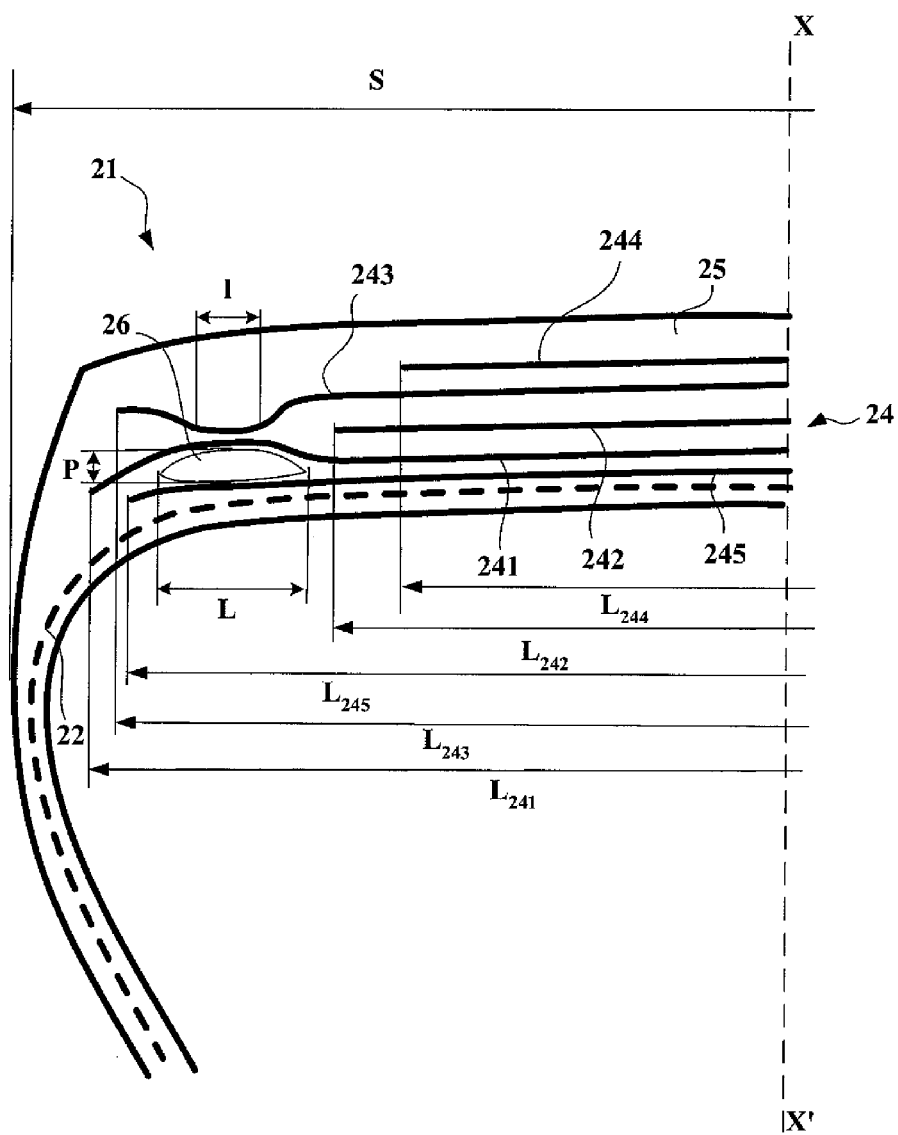
FIG. 2: a meridian view of a diagram of a tire according to a second embodiment of the invention.

In FIG. 2, the tire 21 differs from the one depicted in FIG. 1 in that it comprises a complementary layer of reinforcing elements 245, known as a triangulation layer, having a width substantially equal to that of the working layer 243. The reinforcing elements of this layer 245 make an angle of about 60° with the circumferential direction and are directed in the same direction as the reinforcing elements of the working layer 241. This layer 245 notably helps to absorb the transverse compressive forces to which all of the reinforcing elements in the crown region of the tire are subjected.

In FIG. 2, the first additional layer 26 of polymer blend is present radially externally in contact with the triangulation layer 245. According to other embodiments of the invention, the first layer 26 of polymer blend may be present partially radially externally in contact with the triangulation layer 245, radially internally in contact with the triangulation layer 245, or partially radially internally in contact with the triangulation layer 245.

Figure 3:
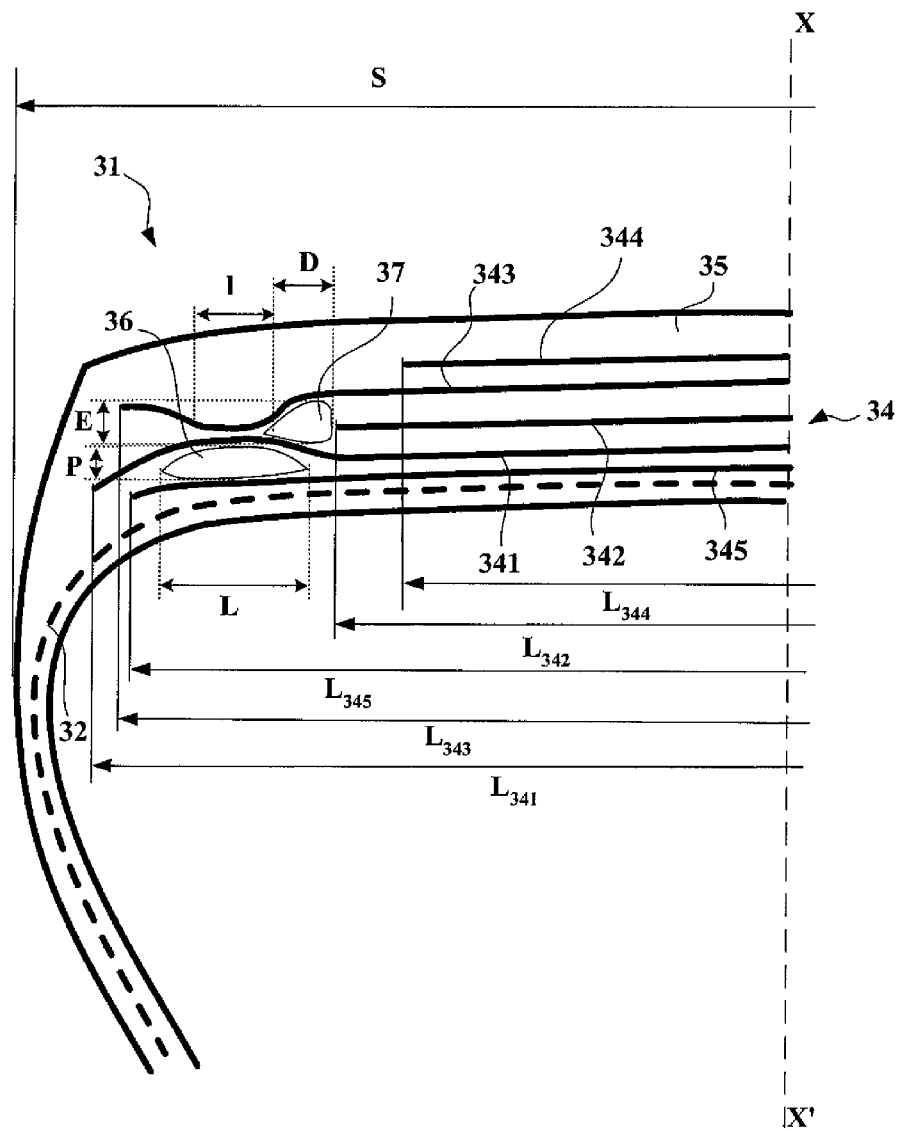
FIG. 3: a meridian view of a diagram of a tire according to a third embodiment of the invention.

In FIG. 3, the tire 31 differs from the one depicted in FIG. 2 in that it comprises a second additional layer of rubber compound 37 having a Mooney plasticity equal to 95 MU, positioned between the end of the layer of circumferential reinforcing elements 342 and the axially interior end of the coupling zone of axial width 1. The second additional layer of rubber compound 37 has a thickness greater than 1.5 mm over a width D equal to 8 mm and a maximum thickness E equal to 2.4 mm.

Tests have been conducted on tires produced according to the invention in accordance with the depiction of FIG. 2 and other tests on tires known as reference tires.

These reference tires have a crown architecture similar to the tires according to the invention when they do not comprise the layer of rubber compound 26.

Straight line running endurance tests were conducted on a test rig that imposed a load of 3800 kg and a speed of 110 km/h on the tires. The tests for the tires according to the invention were conducted under conditions identical to those applied to the reference tires.

The tests thus conducted demonstrated that the distances covered during each of these tests were substantially identical for the tires according to the invention and for the reference tires. It appears on the other hand that the results obtained with the tires according to the invention have smaller variations than those regarding the results of the reference tires. With the reference tires, a scatter of the distances covered is observed of the order of 10% whereas the scatter observed with the tires according to the invention is of the order of 5%.

The invention claimed is:

1. A tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements positioned radially between two working crown layers, the working crown layers adjacent to the layer of circumferential reinforcing elements being on each side of the equatorial plane and in the axial continuation of the layer of circumferential reinforcing elements coupled over an axial width 1, in order thereafter to be decoupled by profiled elements of rubber compound at least over the remainder of the width common to the two working layers, wherein a first additional layer of polymer blend having a width at least equal to the width 1 of the coupling zone of the working crown layers and having a maximum thickness of less than two times the thickness of the layer of circumferential reinforcing elements is positioned radially under the working crown layer radially adjacent to and inside the layer of circumferential reinforcing elements and does not extend axially outward from the equatorial plane further than the decoupled remainder of the axial width common to the two working layers, and in that the first additional layer of polymer blend is at least partially radially superposed on the coupling zone of the working crown layers, and wherein the position of the first additional layer of polymer blend controls a position of a radial displacement of the radially interior working crown layer, and the thickness of the first additional layer of polymer blend controls an amount of the radial displacement of the radially interior working crown layer, thereby coupling the radially interior working crown layer with the radially exterior working crown layer.

2. The tire according to claim 1, wherein the width of the first additional layer of polymer blend is less than 0.45 times the difference between the width of the working crown layer radially adjacent to and inside the layer of circumferential reinforcing elements and the width of the layer of circumferential reinforcing elements.

3. The tire according to claim 1, wherein a second additional layer of polymer blend having a thickness greater than 1.5 mm over an axial width greater than $0.1 \times d$ is positioned axially between the axially exterior end of the layer of circumferential reinforcing elements and the axially interior end of the coupling zone of the working crown layers adjacent to the layer of circumferential reinforcing elements.

4. The tire according to claim 3, wherein the second additional layer of polymer blend positioned axially between the axially exterior end of the layer of circumferential reinforcing elements and the axially interior end of the coupling zone of the working crown layers adjacent to the layer of circumferential reinforcing elements has an axial width of less than 0.5×d.

5. The tire according to claim 1, wherein the layer of circumferential reinforcing elements has an axial width greater than 0.4×S.

6. The tire according to claim 1, at least two working crown layers having different axial widths, wherein the difference between the axial width of the axially widest working crown layer and the axial width of the axially least wide working crown layer is between 10 and 30 mm.

7. The tire according to claim 6, wherein the axially widest working crown layer is radially on the inside of the other working crown layers.

8. The tire according to claim 1, wherein the reinforcing elements of at least one layer of circumferential reinforcing elements are metal reinforcing elements with a secant modulus at 0.7% elongation between 10 and 120 GPa and a maximum tangent modulus of less than 150 GPa.

9. The tire according to claim 1, wherein the reinforcing elements of at least one layer of circumferential reinforcing elements are metal reinforcing elements that are cut in such a way as to form portions of a length shorter than the circumference of the least long ply, but greater than 0.1 times the said circumference, the cuts between portions being axially offset from one another.

10. The tire according to claim 1, wherein the reinforcing elements of at least one layer of circumferential reinforcing elements are wavy metal reinforcing elements, the ratio a/λ, of the amplitude of the wave a to the wavelength λ being at most equal to 0.09.

11. The tire according to claim 1, wherein the angle formed with the circumferential direction by the reinforcing elements of the working crown layers is less than 30°.

12. The tire according to claim 1, wherein the working crown layers comprise reinforcing elements that are crossed from one ply to the other, making with the circumferential direction angles that vary according to the axial direction.

13. The tire according to claim 1, wherein the crown reinforcement is supplemented radially on the outside by at least one additional ply of elastic reinforcing elements, oriented with respect to the circumferential direction at an angle between 10° and 45° and of the same direction as the angle formed by the inextensible elements of the working ply radially adjacent to it.

14. The tire according to claim 1, wherein the crown reinforcement further comprises a triangulation layer formed of metal reinforcing elements that make angles greater than 60° with the circumferential direction.

15. A process for manufacturing a tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements positioned radially between two working crown layers, the working crown layers adjacent to the layer of circumferential reinforcing elements being on each side of the equatorial plane and in the axial continuation of the layer of circumferential reinforcing elements coupled over an axial width 1, in order thereafter to be decoupled by profiled elements of rubber compound at least over the remainder of the width common to the two working layers, wherein a first layer of polymer blend having a width at least equal to the width 1 of the coupling zone of the working crown layers and having a maximum thickness of less than two times the thickness of the layer of circumferential reinforcing elements is positioned radially under the working crown layer radially adjacent to and inside the layer of circumferential reinforcing elements and does not extend axially outward from the equatorial plane further than the decoupled remainder of the axial width common to the two working layers, wherein the first additional layer of polymer blend is at least partially radially superposed on the coupling zone of the working crown layers, and wherein the Mooney plasticity of the first additional layer of uncrosslinked blend is greater than the Mooney plasticity of the uncrosslinked calendering blend of the working crown layers adjacent to the layer of circumferential reinforcing elements.

16. The process for manufacturing a tire according to claim 15, wherein the Mooney plasticity of the first additional layer of uncrosslinked blend is greater than 90 MU and preferably greater than 95 MU.

17. The process for manufacturing a tire according to claim 15, wherein a second additional layer of polymer blend having a thickness greater than 1.5 mm over an axial width greater than 0.1×d is positioned axially between the axially exterior end of the layer of circumferential reinforcing elements and the axially interior end of the coupling zone of the working crown layers adjacent to the layer of circumferential reinforcing elements.

18. The process for manufacturing a tire according to claim 17, wherein the Mooney plasticity of the second additional layer of uncrosslinked blend is greater than 90 MU and preferably greater than 95 MU.

19. The tire according to claim 1, wherein the layer of polymer blend axially extends at least across the entire width of the coupling zone.

* * * * *